United States Patent
Brand et al.

(10) Patent No.: US 9,587,701 B2
(45) Date of Patent: Mar. 7, 2017

(54) NEGATIVE STIFFNESS APPARATUS

(71) Applicant: GM GLOBAL TECHNOLOGY OPERATIONS LLC, Detroit, MI (US)

(72) Inventors: Dvir Brand, Hod-Hasharon (IL); Avshalom Suissa, Kiryat Ono (IL); Alon Capua, Haarhava (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 10 days.

(21) Appl. No.: 14/726,673

(22) Filed: Jun. 1, 2015

(65) Prior Publication Data

US 2015/0354654 A1    Dec. 10, 2015

Related U.S. Application Data

(60) Provisional application No. 62/009,416, filed on Jun. 9, 2014.

(51) Int. Cl.
    *F16F 9/04*    (2006.01)
    *F16F 9/06*    (2006.01)

(52) U.S. Cl.
    CPC ............. *F16F 9/06* (2013.01); *F16F 9/0427* (2013.01); *F16F 9/0418* (2013.01); *F16F 2228/063* (2013.01)

(58) Field of Classification Search
    CPC ............................. F16F 9/0418; F16F 9/0427
    USPC ........ 188/166, 268; 267/64.25, 64.11, 64.13, 267/64.15, 64.23, 64.24, 64.27
    See application file for complete search history.

(56) References Cited

U.S. PATENT DOCUMENTS

| | | | | |
|---|---|---|---|---|
| 2,846,983 A * | 8/1958 | Otto | ........................ | F01B 19/04 267/122 |
| 3,371,894 A * | 3/1968 | Hartnell-Beavis | ........ | F16D 3/80 248/631 |
| 3,498,426 A * | 3/1970 | Nakano | ..................... | B60T 8/26 188/DIG. 2 |
| 4,493,481 A * | 1/1985 | Merkle | .................. | B60G 11/27 267/64.24 |
| 6,375,170 B1 * | 4/2002 | Thurow | ............... | A47C 27/065 267/75 |
| 6,676,115 B2 * | 1/2004 | Thurow | .................... | F16F 9/05 188/297 |
| 6,685,173 B2 * | 2/2004 | Oldenettel | ............. | B60G 11/28 267/122 |
| 6,752,388 B2 * | 6/2004 | Thurow | ................ | F16F 9/0436 267/122 |
| 6,827,341 B2 * | 12/2004 | Bank | ...................... | B60G 11/27 188/322.12 |
| 6,905,113 B2 * | 6/2005 | Bank | ..................... | F16F 9/0454 267/122 |

* cited by examiner

*Primary Examiner* — Thomas Irvin

(57) ABSTRACT

A negative stiffness apparatus includes a fluid filled bellows interposed between a first surface and a second surface wherein the bellows and the first and second surfaces have an orientation of substantial equilibrium between the first and second surfaces. The bellows and the first and second surfaces include other orientations wherein the first and second surfaces are displaced from the orientation of substantial equilibrium and the bellows exerts a displacement force to urge the first and second surfaces further away from the orientation of substantial equilibrium.

17 Claims, 5 Drawing Sheets

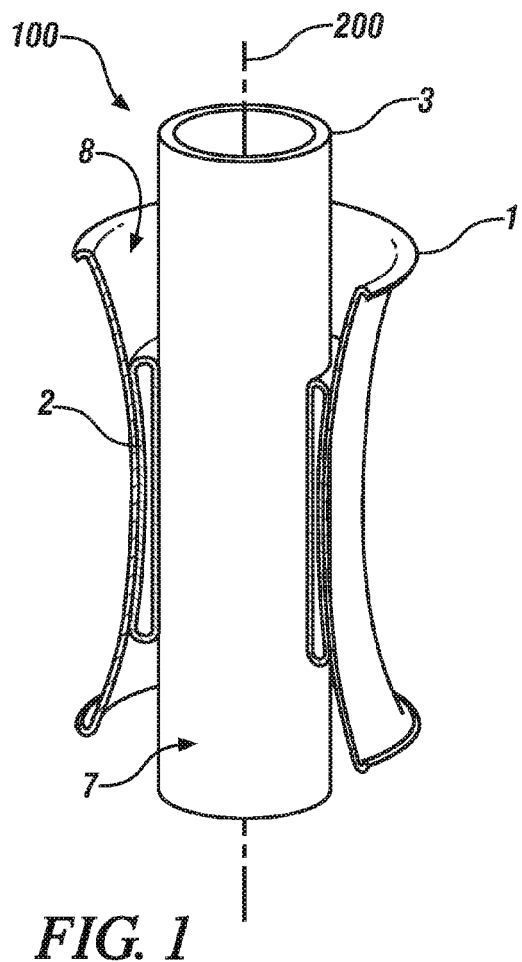
FIG. 1
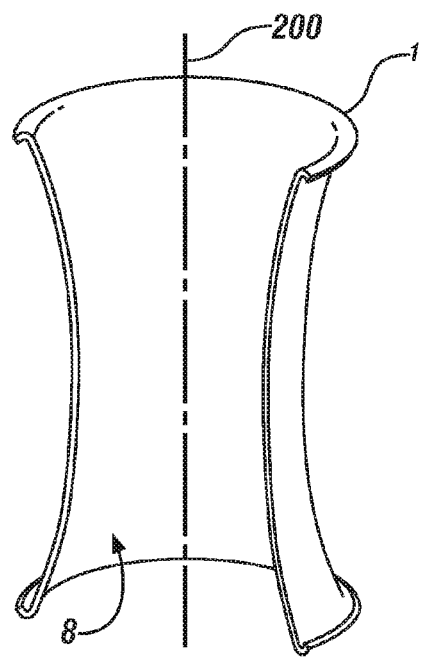
FIG. 2-A
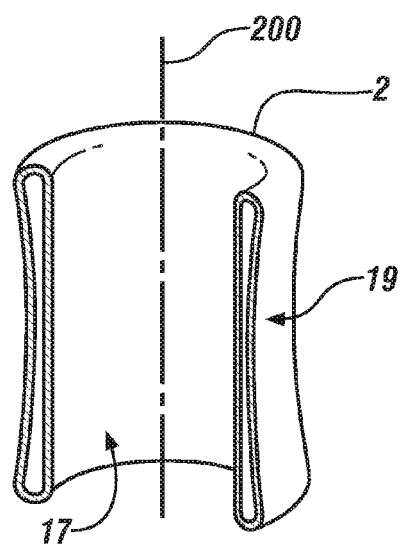
FIG. 2-B
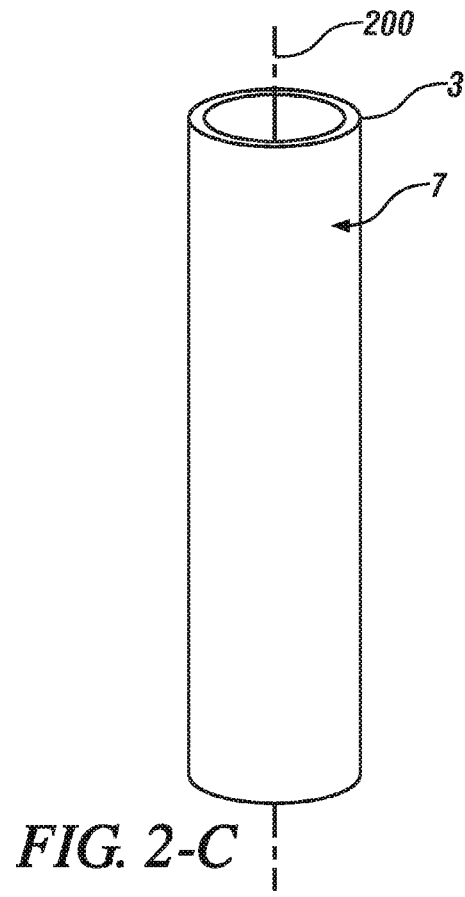
FIG. 2-C

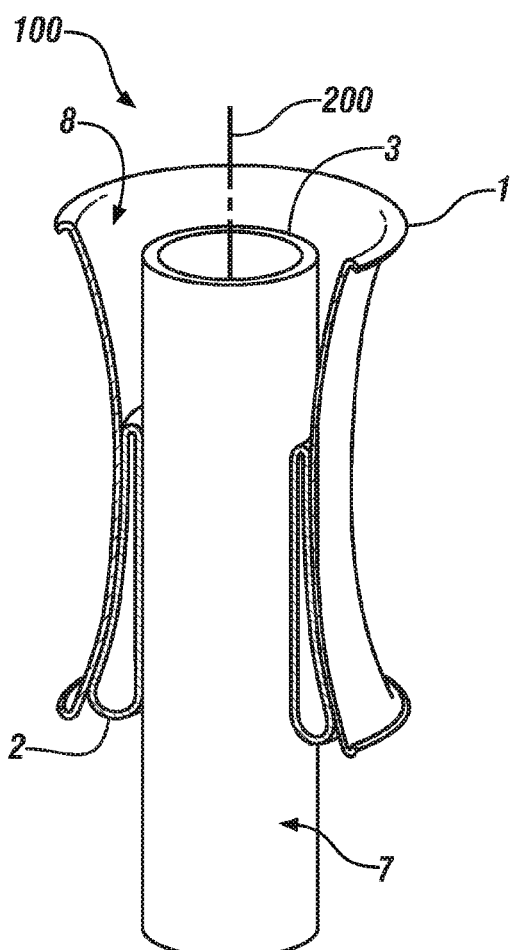
FIG. 3-A
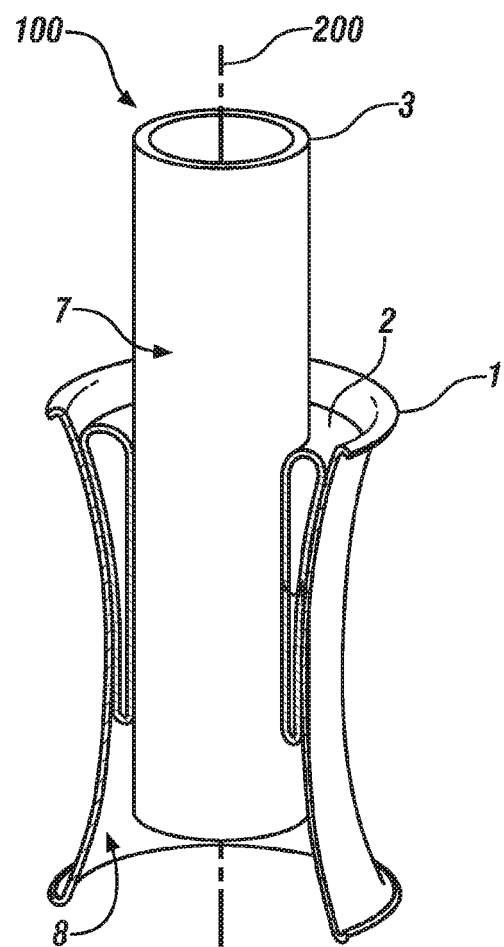
FIG. 3-B

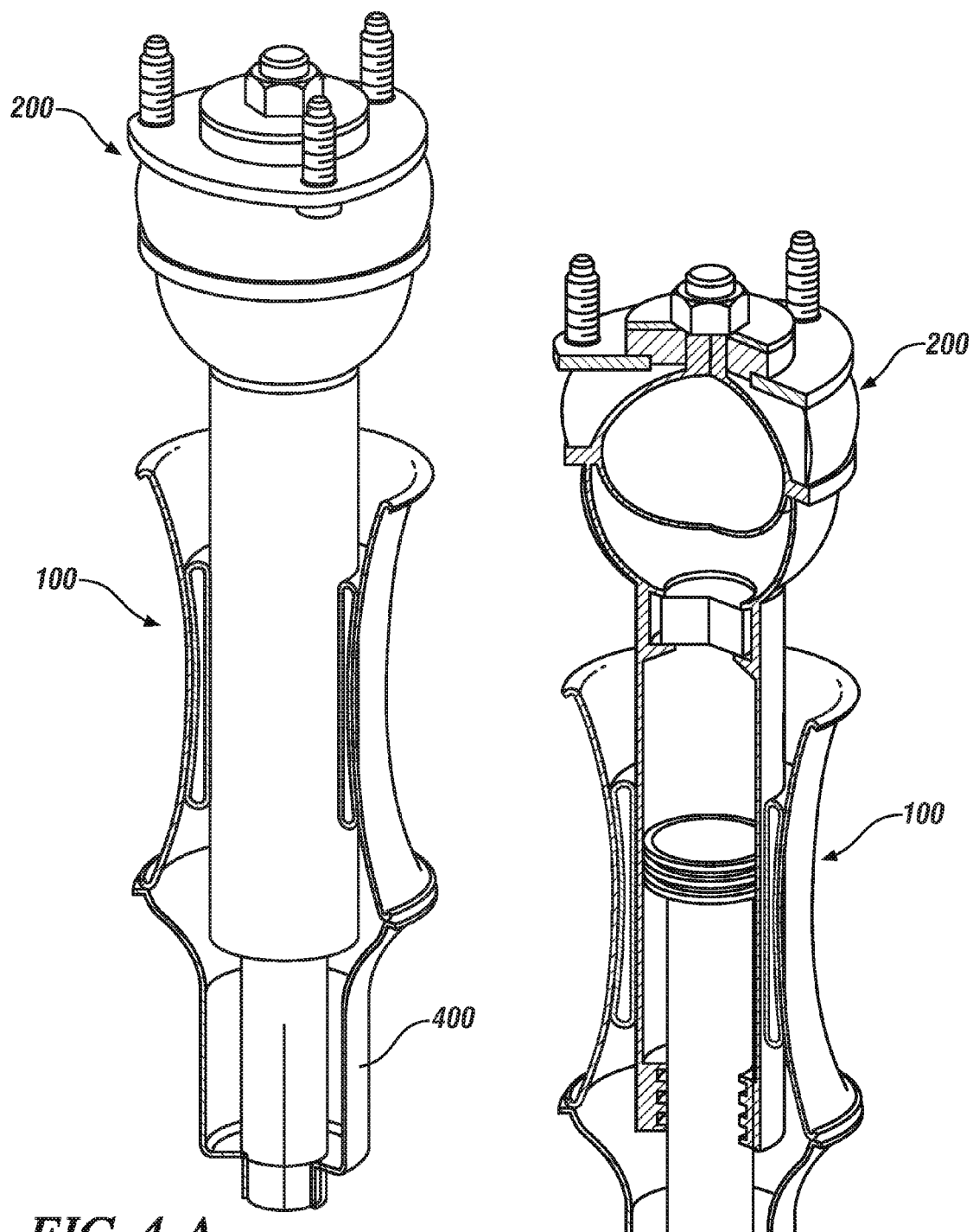

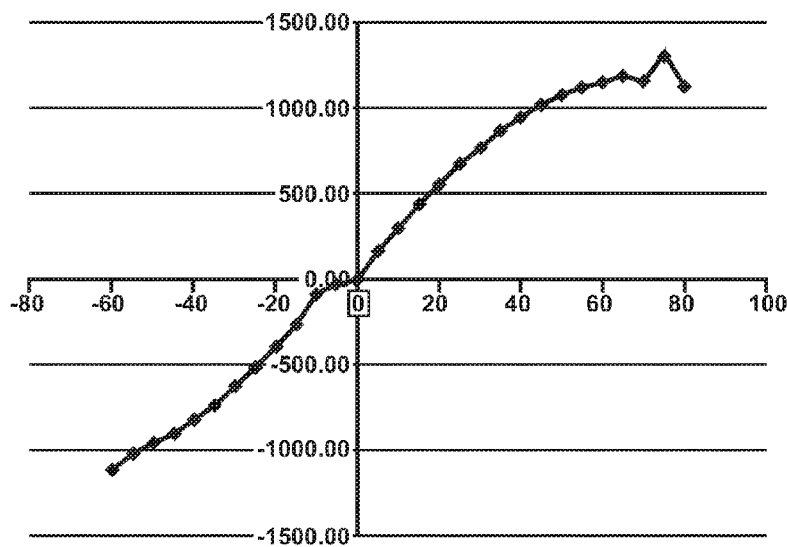
FIG. 5
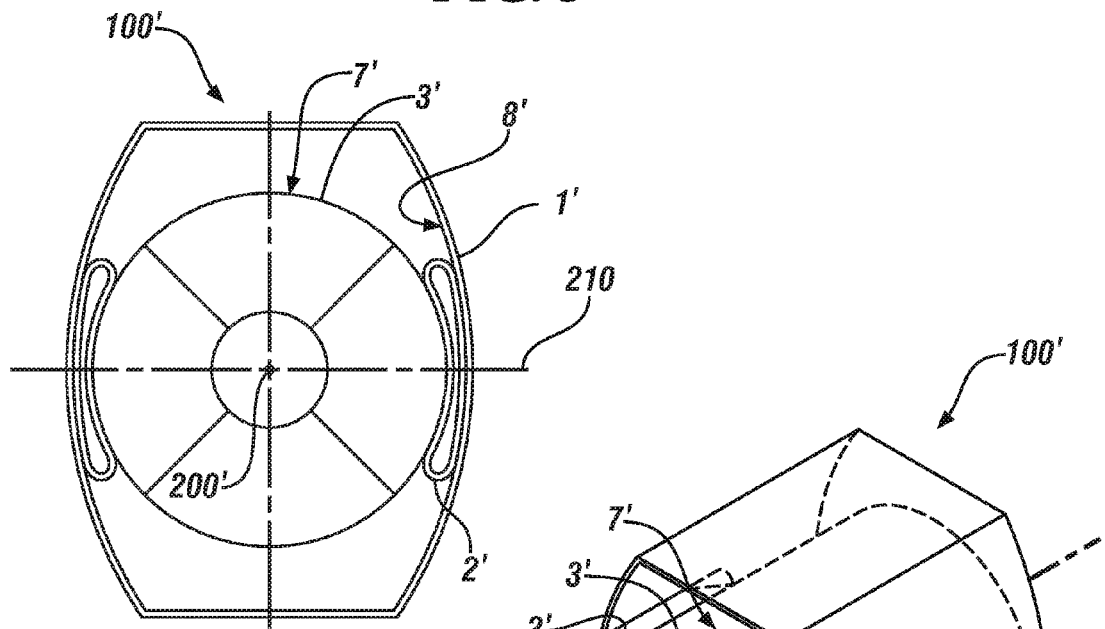
FIG. 6-A
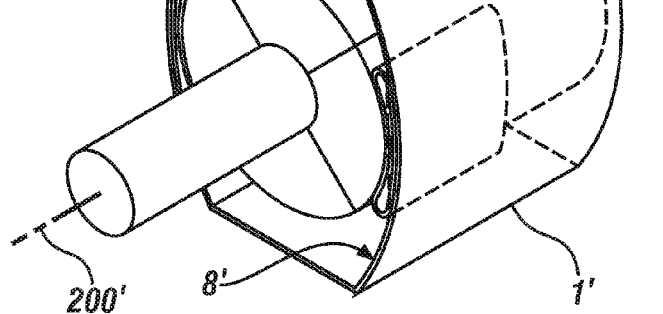
FIG. 6-B

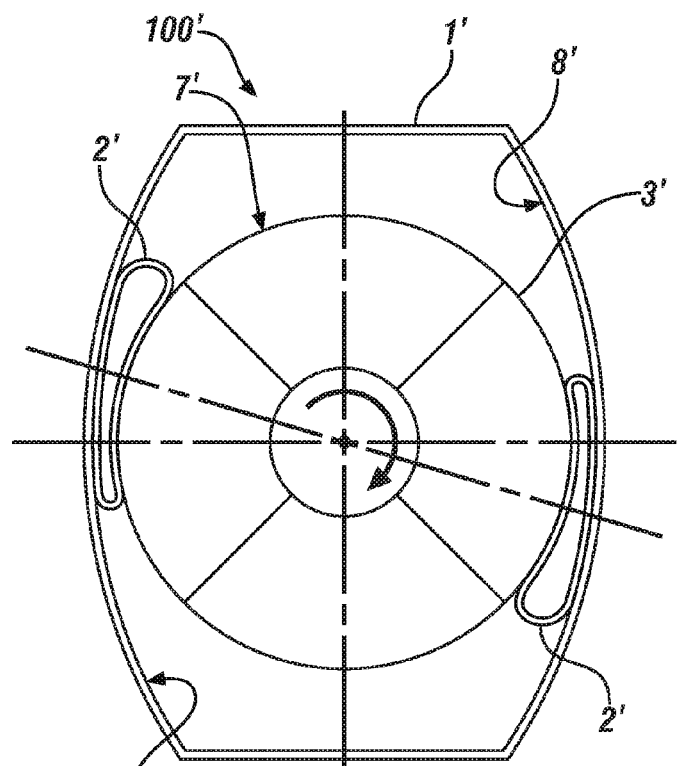
*FIG. 7-A*
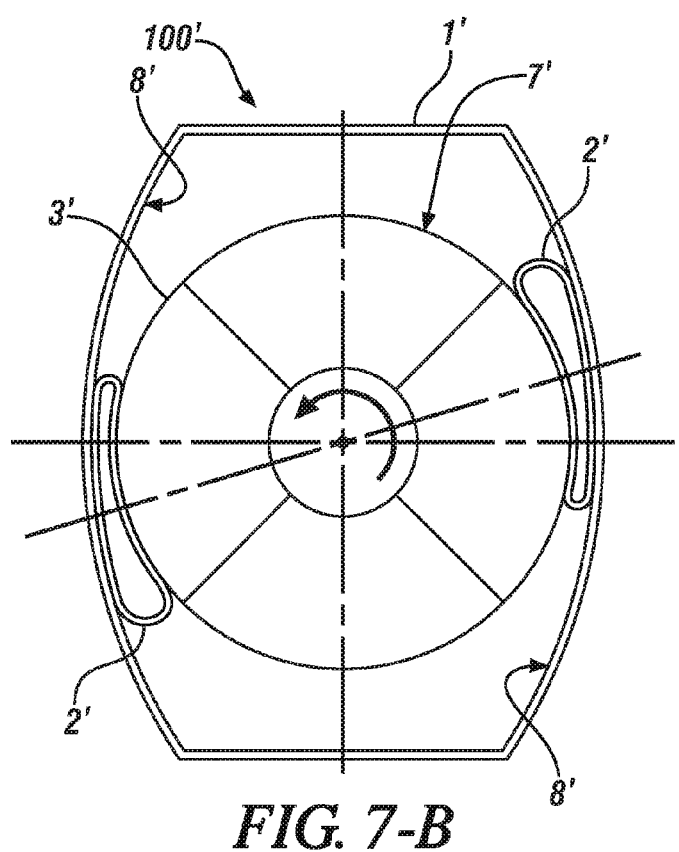
*FIG. 7-B*

NEGATIVE STIFFNESS APPARATUS

CROSS REFERENCE TO RELATED APPLICATIONS

This application claims the benefit of U.S. Provisional Application No. 62/009,416, filed on Jun. 9, 2014, which is incorporated herein by reference.

TECHNICAL FIELD

This disclosure relates to negative stiffness apparatus.

BACKGROUND

The statements in this section merely provide background information related to the present disclosure. Accordingly, such statements are not intended to constitute an admission of prior art.

Negative stiffness apparatus are known which achieve their performance objectives by, for example, mechanical buckling or electromagnetics. Mechanical negative stiffness apparatus require joints which exhibit wear and friction. Moreover, mechanical implementations requiring perpendicular springs may suffer packaging drawbacks. Electromagnetic implementations may take the form of linear motors which are massive and costly, or solenoid attractors which are limited to small displacements. Additionally, electromagnetic implementations require energy input, including while holding.

SUMMARY

A negative stiffness apparatus includes a fluid filled bellows interposed between a first surface and a second surface wherein the bellows and the first and second surfaces have an orientation of substantial equilibrium between the first and second surfaces. The bellows and the first and second surfaces include other orientations wherein the first and second surfaces are displaced from the orientation of substantial equilibrium and the bellows exerts a displacement force to urge the first and second surfaces further away from the orientation of substantial equilibrium.

BRIEF DESCRIPTION OF THE DRAWINGS

One or more embodiments will now be described, by way of example, with reference to the accompanying drawings, in which:

FIG. 1 illustrates an embodiment of a linear motion negative stiffness apparatus in equilibrium orientation, in accordance with the disclosure;

FIGS. 2-A through 2-C illustrate certain key components of the linear motion negative stiffness apparatus of FIG. 1, in accordance with the disclosure;

FIGS. 3-A and 3-B illustrate the linear motion negative stiffness apparatus of FIG. 1 displaced from the equilibrium orientation, in accordance with the disclosure;

FIGS. 4-A and 4-B illustrate the linear motion negative stiffness apparatus of FIG. 1 applied to a hydro-pneumatic suspension strut, in accordance with the disclosure;

FIG. 5 illustrates force versus displacement data from Table 1, in accordance with the disclosure;

FIGS. 6-A and 6-B illustrate an embodiment of a rotational motion negative stiffness apparatus in equilibrium orientation, in accordance with the disclosure; and FIGS. 7-A and 7-B illustrate the rotational motion negative stiffness apparatus of FIGS. 6-A and 6-B displaced from the equilibrium orientation, in accordance with the disclosure.

DETAILED DESCRIPTION

Referring now to the drawings, wherein the showings are for the purpose of illustrating certain exemplary embodiments only and not for the purpose of limiting the same, FIG. 1 illustrates a negative stiffness apparatus 100 that is linear in operation, i.e. linear motion negative stiffness apparatus. The linear motion negative stiffness apparatus 100 includes three main components: outer tube or guide 1, inner tube or guide 3, and flexible, substantially toroidally shaped bellows 2. Thus, in the general case, a linear motion negative stiffness apparatus in accordance with the present disclosure includes a substantially toroidally shaped bellows interposed between a first surface and a second surface.

Bellows 2 is generally located between and in contact with inner surface 8 of outer guide 1 and outer surface 7 of inner guide 3. The general portion of the bellows 2 in contact with the inner surface 8 of outer guide 1 may be referred to as an outer wall 19, and the general portion of the bellows 2 in contact with the outer surface 7 of inner guide 3 may be referred to as an inner wall 17. Bellows end walls may generally refer to the axially opposite portions of the bellows 2 joining the inner and outer walls. Since the bellows positional and contact relationship between and with the surfaces of the inner and outer guides varies in operation, it is understood that inner, outer, and end walls are relative descriptors and do not refer to absolute portions of the bellows. Bellows 2 is flexible being fabricated from rubber or elastomeric material and is filled with a fluid, either gas or liquid.

Inner guide 3 is elongated and cylindrical and aligned lengthwise along an axis of linear motion (longitudinal centerline 200). Outer guide 1 is elongated and aligned lengthwise along the axis of linear motion but has generally convex cross sectional walls when sectioned through the longitudinal centerline 200. When sectioned perpendicular to the longitudinal centerline 200, the cross sections of outer guide 1 are circular with a centrally located minimum circumference and circumferences that monotonically increase toward each end of the outer guide 1 away from the minimum circumference. While inner and outer guides 3 and 1, respectively, are illustrated as longitudinally symmetrical, applicants envision asymmetrical geometries, for example guide 1 minimum circumference located closer to one end, generally convex cross sections of varying curvature, or tubular structures that flare or reduce as the case may be only at one end thereof. Moreover, while inner guide 3 is cylindrical, inner guide 3 may have other geometries. For example, inner guide 3 may have a maximum central circumference and circumferences that reduce toward each end away from the maximum central circumference. While inner guide 3 is illustrated as an empty, hollow cylinder, the guide may alternatively be completely solid, be hollow with a filled core, or any construction apparent to one having ordinary skill in the art. Material used to fabricate inner guide 3 and outer guide 1 may be any application suitable material depending upon such considerations a mass, strength, operating environment, design for manufacturing, etc. Exemplary materials may include conventional steel stock tubing. Techniques for flaring and reducing tube stock are well known to those having ordinary skill in the art and may include, for example, ram forming, rotary forming, and hydroforming.

Negative stiffness apparatus 100 is illustrated in FIG. 1 with longitudinally symmetrical arrangement between outer guide 1, and bellows 2, i.e. bellows 2 is centrally located with respect to the minimum cross sectional circumference of outer guide 1. Bellows 2 is constrained between the inner surface 8 of outer guide 1 and the outer surface 7 of inner guide 3. Even at the narrowest section of guide 1, an open channel may exist on the interior of bellows 2 for fluid communication therein. In the component orientation of FIG. 1, bellows 2 is squeezed to a nearly uniform wall to wall thickness from end to end and, since symmetrically arranged with respect to the outer guide 1, longitudinal forces (if any in accordance with the profiles of inner surface 8 and outer surface 7) are balanced. Thus, the orientation of FIG. 1 is referred to as an orientation of substantial equilibrium or an equilibrium state. Such position may also be referred to as a nominal or trimmed position. Bellows 2 is attached to the inner guide 3 and the outer guide 1 at the respective surfaces where they meet at one or more points in alignment with the section taken through the center of symmetry (i.e. the section perpendicular to the longitudinal axis taken through the smallest circumference of the outer guide 1). Such attachment may be effected by way of adhesives or cooperative positive and negative bead features bead, for example.

Additional contextual reference is made to FIGS. 3-A and 3-B. As the inner guide 3 moves relative to the outer guide 1, the constrained bellows 2 rolls between the inner surface 8 and the outer surface 7. Bellows 2 adapts in shape to the changing gap between the inner surface 8 and outer surface 7 and a resulting change in volume enclosed. The shape of the outer guide 1, the inner guide 3, or both can be designed to achieve a desired volume constraint change at different positions between the inner and the outer guides and resultant axial forces acting upon the guides.

The volume change results in a pressure change according to the gas rules assuming adiabatic or isothermal processes. This volume/pressure change results in a work being done by the apparatus 100, which results in a linear force acting between the inner and outer guides. Work done can be estimated (for an isothermal process) in accordance with the following relationship:

$$W = P_1 * V_1 * \ln(V_2/V_1) \quad [1]$$

wherein

W is incremental work done in moving the inner and outer guides from a first positional relationship to a second positional relationship;

$P_1$ is bellows pressure in the first positional relationship;

$V_1$ is bellows volume at a first deflection point $\delta_1$ (first positional relationship between the inner and outer guides); and $V_2$ is bellows volume at a second first deflection point $\delta_2$ (second positional relationship between the inner and outer guides).

This work is equal to the work done by the force acting along the relative movement between the inner and outer guides in accordance with the following relationship.

$$W = F * \delta_{2-1} \quad [2]$$

wherein

W is incremental work done in moving the inner and outer guides from the first positional relationship to the second positional relationship;

F is the average force acting along the relative movement between the inner and outer guides from the first positional relationship to the second positional relationship; and $\delta_{2-1}$ is the deflection from the first positional relationship to the second positional relationship.

From EQs. [1] and [2] above a force versus displacement performance can be designed by one having ordinary skill in the art.

With reference to FIGS. 4-A and 4-B, application to a hydro-pneumatic suspension strut 200 is illustrated. The negative stiffness apparatus 100 is a simple and cost effective way to implement negative stiffness with low inertia, almost no friction, controlled profile with simplicity and proven technologies, while enabling a concentric packaging around the strut, replacing the eliminated coil spring volume. Alternatively, the negative stiffness apparatus 100 can be packaged between a damper and coil spring, for example in more conventional passive suspensions. In either case, the trimmed position can be adjusted by the relative height between the inner and outer guides established by length of a connecting sleeve 400. One having ordinary skill in the art understands that trim position adjustment may also be actively changed.

Table 1 illustrates bellows volume (V), bellows pressure (P), work done by volume/pressure change (W), and average force acting on strut (F) at various displacements ($\delta$) from trimmed position of the exemplary application of negative stiffness apparatus 100 to hydro-pneumatic suspension strut 200 as illustrated in FIGS. 4-A and 4-B. And, FIG. 5 illustrates average force acting on strut (F) versus displacements ($\delta$) from trimmed position of the exemplary application of negative stiffness apparatus 100 to hydro-pneumatic suspension strut 200 as illustrated in FIGS. 4-A and 4-B.

TABLE 1

| $\delta$ deflection from trimmed position [mm] | V bellows volume [cm$^3$] | P bellows pressure [Atm] | W work done by volume/pressure change [J] | F average force [N] |
| --- | --- | --- | --- | --- |
| 80 | 191.80 | 4.25 | 5.67 | 1134.91 |
| 75 | 178.90 | 4.56 | 6.49 | 1298.62 |
| 70 | 165.20 | 4.93 | 5.83 | 1165.51 |
| 65 | 153.80 | 5.30 | 5.99 | 1198.18 |
| 60 | 142.90 | 5.70 | 5.79 | 1158.02 |
| 55 | 133.10 | 6.12 | 5.64 | 1128.08 |
| 50 | 124.20 | 6.56 | 5.43 | 1085.26 |
| 45 | 116.20 | 7.01 | 5.14 | 1027.68 |
| 40 | 109.10 | 7.47 | 4.77 | 953.67 |
| 35 | 102.90 | 7.92 | 4.39 | 878.66 |
| 30 | 97.50 | 8.36 | 3.85 | 770.22 |
| 25 | 93.00 | 8.76 | 3.40 | 680.01 |
| 20 | 89.20 | 9.14 | 2.79 | 557.64 |
| 15 | 86.20 | 9.45 | 2.20 | 440.83 |
| 10 | 83.90 | 9.71 | 1.53 | 305.93 |
| 5 | 82.34 | 9.90 | 0.84 | 167.14 |
| 0 | 81.50 | 10.00 | — | 0.00 |
| −5 | 81.60 | 9.99 | 0.10 | −19.99 |
| −10 | 82.00 | 9.94 | 0.40 | −79.71 |
| −15 | 83.30 | 9.78 | 1.23 | −256.39 |
| −20 | 85.30 | 9.55 | 1.93 | −386.73 |
| −25 | 88.00 | 9.26 | 2.54 | −507.95 |
| −30 | 91.40 | 8.92 | 3.09 | −617.91 |
| −35 | 95.60 | 8.53 | 3.65 | −732.32 |
| −40 | 100.50 | 8.11 | 4.07 | −814.75 |

TABLE 1-continued

| δ deflection from trimmed position [mm] | V bellows volume [cm³] | P bellows pressure [Atm] | W work done by volume/pressure change [J] | F average force [N] |
|---|---|---|---|---|
| −45 | 106.20 | 7.67 | 4.50 | −899.21 |
| −50 | 112.60 | 7.24 | 4.77 | −953.84 |
| −55 | 119.80 | 6.80 | 5.05 | −1010.31 |
| −60 | 128.20 | 6.36 | 5.52 | −1104.62 |

FIGS. 6-A and 6-B illustrates a negative stiffness apparatus 100' that is rotational in motion, i.e. rotational motion negative stiffness apparatus. The rotational motion negative stiffness apparatus 100' includes three main components: outer guide 1', inner guide 3', and flexible bellows 2'. Bellows 2' is generally located between and in contact with inner surface 8' of outer guide 1' and outer surface 7' of inner guide 3'. The general portion of the bellows 2' in contact with the inner surface 8' of outer guide 1' may be referred to as an outer wall, and the general portion of the bellows 2' in contact with the outer surface 7' of inner guide 3' may be referred to as an inner wall. Bellows end walls may generally refer to the circumferentially opposite portions of the bellows 2' joining the inner and outer walls. Since the bellows positional and contact relationship between and with the surfaces of the inner and outer guides, it is understood that inner, outer, and end walls are relative descriptors and do not refer to absolute portions of the bellows. Thus, in the general case, a rotary motion negative stiffness apparatus in accordance with the present disclosure includes a bellows interposed between a first surface and a second surface. Bellows 2' is flexible being fabricated from rubber or elastomeric material and is filled with a fluid, either gas or liquid.

Inner guide 3' is cylindrical. Outer guide 1' has generally concave inner surface 8' when sectioned perpendicular to the longitudinal centerline 200'. Inner surface 8' has a radius of curvature or profile that is greater than that of outer surface 7' of inner guide 3'. A minimum clearance between outer surface 7' and inner surface 8' corresponds to axis 210 which is normal to the longitudinal axis 200'.

Bellows 2' is symmetrically located with respect to the minimum clearance between outer surface 7' and inner surface 8' corresponding to axis 210. Bellows 2' is constrained between the inner surface 8' of outer guide 1' and the outer surface 7' of inner guide 3'. Even at the area of narrowest clearance between the inner surface 8' and the outer surface 7', an open channel may exist on the interior of bellows 2' for fluid communication therein. In the component orientation of FIGS. 6-A and 6-B, bellows 2' is squeezed to a nearly uniform wall to wall thickness from end to end and, since symmetrically arranged with respect to outer surface 7' and inner surface 8', rotational forces (if any in accordance with the profile of inner surface 8' and outer surface 7') are balanced. Thus, the orientation of FIGS. 6-A and 6-B is referred to as an orientation of substantial equilibrium or an equilibrium state. Such position may also be referred to as a nominal or trimmed position. Bellows 2' is attached to the inner guide 3' and the outer guide 1' at the respective surfaces where they meet at one or more points in alignment with the longitudinal axis 200'.

Additional contextual reference is made to FIGS. 7-A and 7-B. As the inner guide 3' moves relative to the outer guide 1' (clockwise in FIG. 7-A), the constrained bellows 2' rolls between the inner surface 8' and the outer surface 7'. Bellows 2' adapts in shape to the changing gap between the inner surface 8' and outer surface 7' and a resulting change in volume enclosed. The shape of the outer guide 1' can be designed to achieve a desired volume constraint change at different positions between the inner and the outer guides and resultant rotational forces acting upon the guides.

As with the linear motion negative stiffness apparatus of FIG. 1, the volume change results in a pressure change according to the gas rules assuming adiabatic or isothermal processes. This volume/pressure change results in a work being done by the apparatus 100', which results in a rotational force acting between the inner and outer guides.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A negative stiffness apparatus, comprising:
   a fluid filled bellows interposed between a first surface and a second surface wherein the bellows and the first and second surfaces include an orientation of substantial equilibrium between the first and second surfaces and wherein the bellows and the first and second surfaces include other orientations wherein the first and second surfaces are displaced from the orientation of substantial equilibrium and the bellows exerts a displacement force to urge the first and second surfaces further away from the orientation of substantial equilibrium.

2. The negative stiffness apparatus of claim 1, wherein the apparatus comprises a linear motion negative stiffness apparatus comprising:
   an elongated inner guide comprising said first surface, said inner guide aligned lengthwise along an axis of linear motion and having respective first and second ends;
   an elongated outer guide comprising said second surface, said inner guide aligned lengthwise along the axis of linear motion and having respective first and second ends, said outer guide arrange coaxially with the inner guide such that the second surface of the outer guide surrounds and faces the first surface of the inner guide in spaced adjacency; and
   said bellows comprising a substantially toroidally shaped, flexible fluid enclosure interposed between and in contact with the first surface of the inner guide and the second surface of the outer guide.

3. The negative stiffness apparatus of claim 2, wherein said bellows comprises an outer wall in contact with the second surface of the outer guide and an inner wall in contact with the first surface of the inner guide, further wherein said outer wall is fixedly attached to said second surface of the outer guide and said inner wall is fixedly attached to said first surface of said inner guide.

4. The negative stiffness apparatus of claim 2, wherein said second surface of the outer guide is outwardly flared toward at least one end.

5. The negative stiffness apparatus of claim 4, wherein said second surface of the outer guide flares linearly.

6. The negative stiffness apparatus of claim 4, wherein said second surface of the outer guide flares curvilinearly.

7. The negative stiffness apparatus of claim 6, wherein said first surface of the inner guide is cylindrical.

8. The negative stiffness apparatus of claim 2, wherein said first surface of the inner guide is inwardly tapered toward at least one end.

9. The negative stiffness apparatus of claim 1, wherein the apparatus comprises a rotational motion negative stiffness apparatus comprising:
   an inner guide comprising said first surface being convex relative to an axis of rotational motion;
   an outer guide comprising said second surface being concave relative to the axis of rotational motion and facing the first surface of the inner guide in spaced adjacency; and
   said bellows comprising a flexible fluid enclosure interposed between and in contact with the first surface of the inner guide and the second surface of the outer guide.

10. The negative stiffness apparatus of claim 9, wherein said bellows comprises an outer wall in contact with the second surface of the outer guide and an inner wall in contact with the first surface of the inner guide, further wherein said outer wall is fixedly attached to said second surface of the outer guide and said inner wall is fixedly attached to said first surface of said inner guide.

11. The negative stiffness apparatus of claim 1, wherein said fluid comprises a liquid.

12. The negative stiffness apparatus of claim 1, wherein said fluid comprises a gas.

13. A negative stiffness apparatus, comprising:
   an elongated inner member aligned lengthwise along an axis of linear motion comprising opposite ends and an outer surface;
   an elongated outer member aligned lengthwise along the axis of linear motion comprising opposite ends and an inner surface outwardly flared toward at least one end, said outer member surrounding said inner member in spaced adjacency; and
   a flexible, toroidal fluid enclosure comprising an outer wall and an inner wall, said enclosure interposed between the outer surface of the inner member and the inner surface of the outer member such that the outer wall is in conformal contact with the inner surface of the outer guide and the inner wall is in conformal contact with the outer surface of the inner member, and wherein said outer wall is fixedly attached to said inner surface of the outer member and said inner wall is fixedly attached to said outer surface of said inner member.

14. The negative stiffness apparatus of claim 13, wherein said second surface of the outer member flares linearly.

15. The negative stiffness apparatus of claim 13, wherein said second surface of the outer member flares curvilinearly.

16. The negative stiffness apparatus of claim 13, wherein said outer surface of the inner member is cylindrical.

17. The negative stiffness apparatus of claim 13, wherein said outer surface of the inner member is inwardly tapered toward at least one end.

* * * * *